US008865889B2

(12) United States Patent
Narita et al.

(10) Patent No.: US 8,865,889 B2
(45) Date of Patent: Oct. 21, 2014

(54) METHODS FOR PREPARING ALKALI CELLULOSE AND CELLULOSE ETHER

(75) Inventors: Mitsuo Narita, Joetsu (JP); Masaki Tabata, Joetsu (JP); Atsushi Yoshida, Joetsu (JP); Hiroshi Umezawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 697 days.

(21) Appl. No.: 11/614,717

(22) Filed: Dec. 21, 2006

(65) Prior Publication Data

US 2007/0144692 A1    Jun. 28, 2007

(30) Foreign Application Priority Data

Dec. 27, 2005  (JP) ................. 2005-375209
Dec. 8, 2006   (JP) ................. 2006-332412

(51) Int. Cl.
*C07H 1/00*     (2006.01)
*C08B 1/10*     (2006.01)
*C08B 11/00*    (2006.01)
*C08B 1/08*     (2006.01)
*C08B 11/193*   (2006.01)

(52) U.S. Cl.
CPC ... *C08B 1/08* (2013.01); *C08B 1/10* (2013.01); *C08B 11/00* (2013.01); *C08B 11/193* (2013.01)
USPC ................. 536/124; 536/56; 536/84

(58) Field of Classification Search
CPC ....................................................... C07H 1/00
USPC ............................................. 536/56, 84, 124
See application file for complete search history.

(56) References Cited

U.S. PATENT DOCUMENTS

| 2,744,012 | A | * | 5/1956 | Bylund ......................... 162/236 |
| 3,322,748 | A | | 5/1967 | Kenji et al. |
| 3,411,986 | A | | 11/1968 | Buchberger et al. |
| 3,915,959 | A | * | 10/1975 | Goheen et al. ................. 536/101 |
| 4,117,223 | A | | 9/1978 | Lodige et al. |
| 4,310,663 | A | | 1/1982 | Hilbig et al. |
| 4,363,784 | A | | 12/1982 | Hilbig et al. |
| 4,508,895 | A | | 4/1985 | Balser |
| 4,547,570 | A | * | 10/1985 | Garner ............................ 536/84 |
| 2002/0099203 | A1 | * | 7/2002 | Kobayashi ...................... 536/84 |

FOREIGN PATENT DOCUMENTS

| JP | 56002302 | | 1/1981 |
| JP | 60040101 | | 3/1985 |
| JP | 1985050801 | | 11/1985 |
| JP | 2001-302701 | A | 10/2001 |
| JP | 2003-171401 | A | 6/2003 |
| JP | 2003-183301 | A | 7/2003 |

OTHER PUBLICATIONS

*Cellulose No Jiten* (Encyclopedia of Cellulose), Edited by the Cellulose Society of Japan, Oct. 10, 2000.
Office Action for Japanese Application No. 2006-332412 dated Mar. 2, 2012.

* cited by examiner

*Primary Examiner* — Brandon Fetterolf
*Assistant Examiner* — Everett White
(74) *Attorney, Agent, or Firm* — Alston & Bird LLP

(57) ABSTRACT

The invention is a method for efficiently preparing alkali cellulose having a uniform alkali distribution therein. More specifically, the invention is a method for preparing alkali cellulose comprising steps of bringing pulp into continuous contact with an alkali metal hydroxide solution in a rotary feeder type contactor to generate a contact mixture, and draining the contact mixture; and a method for preparing cellulose ether comprising use of the alkali cellulose thus prepared; an apparatus for preparing alkali cellulose, comprising a rotary feeder comprising a cyclic housing comprising an inlet port and an outlet port, a cyclic contact drum being circularly rotatable along the housing in the housing and comprising a plurality of filter cells arranged in a circumferential direction, and a filtrate-discharging tube being disposed in a diameter direction inside of the cyclic contact drum and collecting the filtrate which has passed the filter, and a drainer for draining a cake discharged from the contactor.

13 Claims, 1 Drawing Sheet

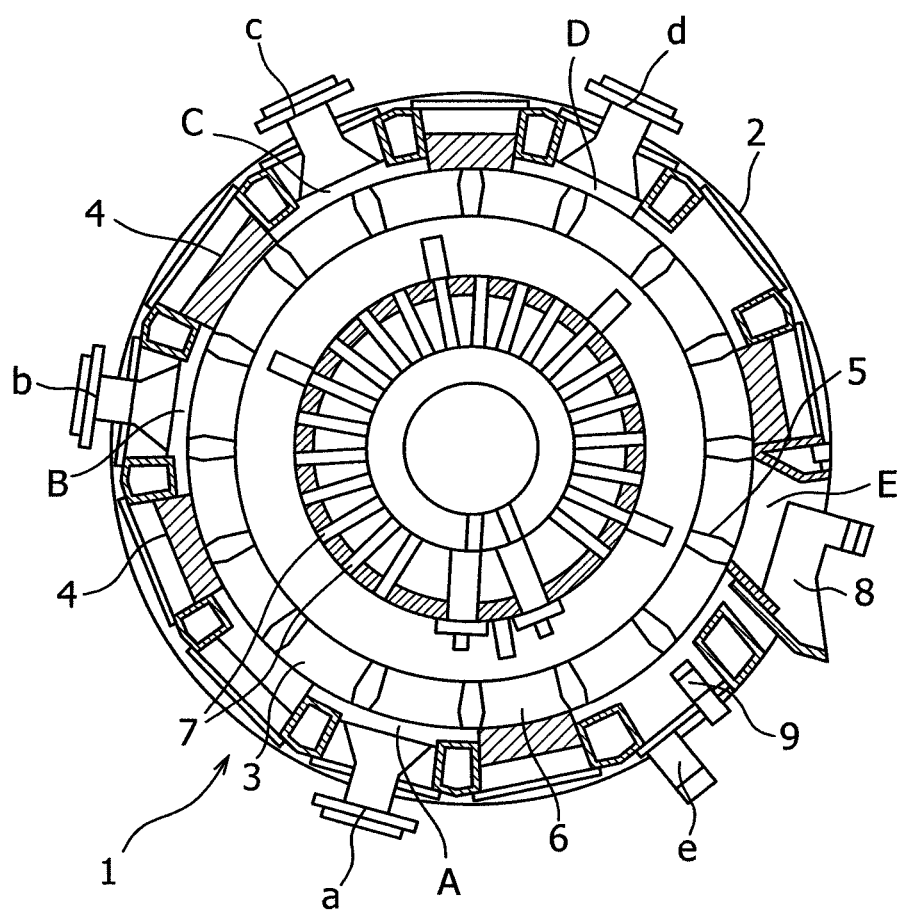

METHODS FOR PREPARING ALKALI CELLULOSE AND CELLULOSE ETHER

BACKGROUND OF THE INVENTION

1. Field of the Invention

The present invention relates to alkali cellulose and a method for preparing cellulose ether using the same.

2. Description of the Related Art

For preparation of cellulose ether, known is a method comprising steps of bringing highly purified pulp into contact with an alkali solution to prepare alkali cellulose, and then etherifying the alkali cellulose with an etherifying agent. Although the cellulose ether obtained as a final product becomes soluble in water by properly controlling the degree of substitution, the cellulose ether contains a water-insoluble portion so that the light transmittance of the aqueous solution may be lowered or the commodity value of the cellulose ether may be damaged as a foreign matter.

The insoluble portion is caused by the presence of a portion having a low degree of substitution which does not have enough substituents to permit dissolution of the cellulose ether in water. One of the causes of it is uneven alkali distribution in the alkali cellulose.

The rolls the alkali plays includes (a) swelling the cellulose to change the crystal structure in the pulp, thereby accelerating the penetration of the etherifying agent, (b) catalyzing the etherification reaction of an alkylene oxide; and (c) serving as a reactant for an alkyl halide. A portion of the pulp out of contact with the aqueous alkali solution is not involved in the reaction and therefore remains as an insoluble portion. Thus, uniformity of the alkali cellulose is related to an amount of the insoluble portion in the alkali cellulose.

A method which has been employed widely for the preparation of an alkali cellulose includes one described in described in Japanese Patent Application Examined Publication No. 60-50801/1985 or Japanese Patent Application Unexamined Publication No. 56-2302/1981 in which an alkali is added in an amount necessary for etherification to pulp powder obtained by pulverization of pulp, and then mixed by mechanically. In this method, however, the alkali is not distributed to all parts of the pup powder so that some parts of the pulp powder remain out of contact with the alkali. As a result, some parts fail to become cellulose ether, stay in the product as an unreacted substance and deteriorate the quality of the cellulose ether. Thus, this method causes a problem.

In order to avoid causing such a problem, a method comprising steps of impregnating a sheet of pulp in an excess alkali solution to allow the pulp to absorb a sufficient amount of an alkali and then pressing the impregnated sheet to remove an unnecessary portion of the alkali and control the alkali to a predetermined amount. When this method is performed industrially, it is the common practice that a rolled pulp is allowed to be rotated freely by elevating the rolled pulp by a supporting shaft put through the central pipe of the roll so as to bring it up from a floor surface, or placing the rolled pulp over a roller. Then, a sheet is drawn from the rolled pulp and introduced into an immersion tank. However, according to this method, the operation is often interrupted because the pulp sheet is torn by a pull force during the immersion. Moreover, to achieve mass production, a huge immersion tank is required for immersing the pulp sheet therein for a predetermined time. Accordingly, this method has defects such as necessity of an adequate space for the tank and inevitable rise in the investment cost. On the other hand, when pulp chips are employed, the cake of them has an irregular surface so that the uneven squeeze occurs when pressed by the press machine. Uneven alkali distribution caused by the uneven squeeze deteriorates the quality of the alkali cellulose.

In page 433 of "Encyclopedia of Cellulose" edited by The Cellulose Society of Japan (published on Nov. 10, 2000), described is a preparation method of alkali cellulose for preparation of viscose, the step comprising adding pulp to an alkali solution to form a gruel-like slurry and squeezing the slurry by a slurry press. Although the defects caused by use of a sheet of pulp are solved, the slurry press causes uneven squeeze and thereby deteriorates the quality of the alkali cellulose due to uneven alkali distribution. In addition, it is difficult to obtain alkali cellulose having a relatively small alkali content which is required as a raw material of cellulose ether using this method alone because of the limitation of the squeeze performance. Thus, it is difficult to apply this method to the preparation of cellulose ether.

In Japanese Patent Publication Examined Publication No. 3-73562/1991, described is a method of preparing alkali cellulose having a desired composition, comprising steps of preparing alkali cellulose from cellulose and excess alkali, and then washing the alkali cellulose with a hydrophilic solvent for removal of the alkali. However, this method needs huge equipment and many operations. In addition, the hydrophilic solvent remains in the alkali cellulose and causes a side reaction with an etherifying agent. Accordingly, a reaction efficiency of the etherifying agent is reduced. Neutralization of the washing liquid or recovery of the alkali is required. Thus, this method is industrially difficult.

SUMMARY OF THE INVENTION

The present invention provides a method for efficiently preparing alkali cellulose having a uniform alkali distribution.

In one aspect of the present invention, there is thus provided a method for preparing alkali cellulose, comprising steps of bringing pulp into continuous contact with an alkali metal hydroxide solution in a rotary feeder type contactor to generate a contact mixture, and draining the contact mixture.

In another aspect of the present invention, there is also provided a method for preparing cellulose ether, comprising use of the alkali cellulose thus prepared.

In a further aspect of the present invention, there is also provided an apparatus for preparing alkali cellulose, comprising
  a rotary feeder type contactor comprising
    a cyclic housing comprising at least one inlet port and at least one outlet port,
    a cyclic contact drum being able to be connected to the inlet port and outlet port, being circularly rotatable along the housing in the housing and having a plurality of filter cells arranged in a circumferential direction inside of the housing, and
    a filtrate-discharging tube being disposed in a diameter direction inside of the cyclic contact drum, being able to connected to a filter of each of the filter cells and collecting a filtrate which has passed through the filter,
    wherein pulp and a metal hydroxide solution introduced into the inlet port can be moved circularly while being brought into contact with each other within each of the filter cells to generate contact mixture, a liquid portion of the contact mixture which has passed through the filter is collected in the filtrate-discharging tube, and a solid portion of the contact mixture is discharged as a cake from the outlet port; and a drainer for draining the cake thus discharged from the outlet port.

According to the present invention, alkali cellulose having a uniform alkali distribution therein can be prepared efficiently. As a result, cellulose ether having high transparency can be prepared efficiently.

BRIEF DESCRIPTION OF THE DRAWING

FIG. 1 illustrates a rotary filter type contactor equipped with a filter at the rotor portion thereof.

DETAILED DESCRIPTION OF THE PREFERRED EMBODIMENT

The pulp to be used in the present invention may be preferably in the form of powder or chips.

The pulp powder may be available by pulverizing a pulp sheet and it is in the form of powder. An average particle size of the pulp powder may be, but not limited to, usually 10 to 1,000 μm. Although no limitation is imposed on the preparation method of the pulp powder, a pulverizer such as knife and hammer mill can be used.

Although no limitation is imposed on the preparation method of pulp chips, the pulp chips may be produced by cutting a pulp sheet with an known cutting device such as a slitter cutter. A continuous cutting device may be advantageous from the viewpoint of investment cost.

The plane surface area of the chip may be usually from 4 to 10,000 mm$^2$, especially preferably from 10 to 2,500 mm$^2$. It may be difficult to prepare the chip having the plane surface area smaller than 4 mm$^2$. The chip having the plane surface area greater than 10,000 mm$^2$ may pose difficulties in handling such as introducing into a rotary feeder type contactor, transferring inside of the contactor, and introducing into a drainer. Considering the pulp chip as a hexahedron, the plane surface area of the chip is the largest surface area of six surface areas of the hexahedral chip.

A rotary feeder type contactor usually rotates in a housing comprising several blades 5 which rotate with the tips of the blades close to the housing or a partition element disposed in the housing. The rotary feeder type contactor continuously carries out an operation comprising steps of introducing raw material pulp and an alkali metal hydroxide solution between two blades, being rotated by a predetermined angle and then discharging the content. According to the present invention, the rotary feeder type contactor may have preferably a rotational speed changeable freely. By changing the rotational speed, the contact time of the pulp with the alkali metal hydroxide solution can be changed so that a ratio of the alkali to cellulose in the target alkali cellulose can be controlled.

According to the present invention, the rotary feeder type contactor may be preferably a rotary feeder, especially preferably a rotary filter type one comprising a filter cell in the cyclic contact drum as illustrated in FIG. 1. More specifically, a rotating filter 1 comprises a fixed housing 2 and a cyclic contact drum 34 which can be rotated in the housing.

The housing 2 may be divided into a plurality of working chambers by partition elements 4. The example shown in FIG. 1 has five chambers A to E. Each partition element may be pressed against the cyclic contact drum 3 by pneumatic pressure. Movable portions may be sealed by an elastomer hermetic frame or membrane sealing. Sealing of the side surface of the cyclic contact drum 3 which rotates relative to the fixed housing 2 can be done by a stuffing box (gland packing) which is not shown in FIG. 1. In the working chambers A to E, connection tubes (a) to (e) are disposed, respectively.

The cyclic contact drum 3 may be divided into filter cells 6 (filtering unit) by a partition ring in the circumferential direction and blades 5 in the diameter direction. The filter cells each may have a screen fitted therein. The size of the opening of the screen (sieve) may be varied depending on the kind of the alkali cellulose, but may be preferably 0.01 to 20 mm.

The filtrate from these filter cells may pass through a filtrate pipe 7 to the outside of the rotating filter 1. The working chamber E may have a scraper 8 and a flat spraying nozzle 9 for spraying a washing solution such as an alkali metal hydroxide solution to the screen in order to prevent the clogging of the opening of the screen. The scraper may have an extension arm. When the extension arm is extended, it extends into the cell filter and can scrape the cake. When it is contracted, it can be housed in the working chamber in order to avoid collision with the blade.

The pulp may be introduced through the connection pipe (a), while the alkali solution may be supplied from at least one nozzle selected from connection pipes (a), (b), (c) and (d). When the connection pipe (a) is used, the pulp and alkali metal hydroxide solution may be mixed in advance and introduced as a slurry. The pulp and the alkali metal hydroxide solution are brought into contact with each other during mixing before the introduction so that this contact time during mixing has to be controlled.

When an empty filter cell reaches a chamber having a connection pipe (a), pulp or a mixture of the pulp and an alkali metal hydroxide solution fed from the connection pipe (a) may be added to the empty filter cell and transported in a rotating direction. Since the filter cell may have a filter on the bottom thereof, a portion of the alkali metal hydroxide solution passes through the filter and a filtering pipe 7 and then through a discharge pipe exclusively used for this chamber to the outside of the system. When the filter cell reaches below each of the connection pipes (b), (c) . . . , the alkali metal hydroxide solution supplied from each of these connection pipes enter in the filter cell. A portion of them similarly passes through the filter and the filter pipe 7 and then through a discharge pipe exclusively used for each chamber to the outside of the system. The content is discharged from the chamber E and sent to a draining step.

When the outlet of the discharge pipe of one chamber is closed, the filtrate has no place to go so that the alkali metal hydroxide solution fills the chamber without passing through the filter. The alkali metal hydroxide solution which has passed the filter can be recycled.

It may be preferable that the rotary feeder type contactor can control the temperature of the alkali metal hydroxide solution or the contact time freely. The composition of the alkali cellulose varies depending on the absorption rate of the alkali metal hydroxide solution by the pulp, and the absorption rate can be adjusted by controlling the temperature of the alkali metal hydroxide solution and the contact retention time. Accordingly, the apparatus capable of controlling it can produce alkali cellulose having a desired composition.

Although the temperature of the alkali metal hydroxide solution can be controlled by a known technique, use of a heat exchanger may be preferred. The heat exchanger may be installed inside or outside the rotary feeder. Although no particular limitation is imposed on the temperature of the alkali metal hydroxide solution, it may be adjusted to be 20 to 80° C. It may be preferable that the rotary feeder type contactor can carry out a continuous treatment. A continuous apparatus can be made smaller in size than a batch system apparatus so that it is advantageous in view of space economy.

The contact time may be adjusted preferably by changing the rotational speed of the rotary feeder.

The rotational speed of the rotary feeder may be preferably 1 to 3,000 rph, especially preferably 8 to 1,500 rph. When the rotational speed is less than 1 rph, the equipment may become impractically large. When the rotational speed is more than 3,000 rph, control of the absorption amount may become difficult.

The contact time between the pulp and the alkali metal hydroxide solution may be preferably from 1 second to 15 minutes, especially preferably from 2 seconds to 2 minutes. When the contact time is less than 1 second, it may be highly difficult to control the absorption amount. When the contact time is more than 15 minutes, the apparatus may be excessively large so that productivity may be deteriorated. In addition, the pulp may absorb too much amount of the alkali so that it may become difficult for any drainer to prepare alkali cellulose having a desired composition suited for the preparation of cellulose ether.

The alkali metal hydroxide solution may be introduced preferably in an amount capable of sufficiently wetting the pulp or the alkali cellulose in the chamber. The amount, per connection pipe, of the alkali metal hydroxide solution to be introduced relative to the weight of the pulp may be preferably 1 L/kg or greater, especially preferably 10 L/kg or greater. Its upper limit may be 10,000 L/kg.

It may be preferably that the rotary feeder type contactor can be evacuated or nitrogen-purged in order to prevent a reduction in the polymerization degree of the alkali cellulose in the presence of oxygen. If the control of the polymerization degree in the presence of oxygen is desired at the same time, the contactor having a structure capable of controlling an oxygen amount may be preferred.

No particular limitation is imposed on the alkali metal hydroxide solution to be used in the invention insofar as alkali cellulose can be obtained using it. An aqueous solution of sodium hydroxide solution or potassium hydroxide may be preferred, with the former one being especially preferred from an economical viewpoint. The concentration of the solution may be preferably 23 to 60% by weight, especially preferably 35 to 55% by weight. When the concentration is less than 23% by weight, it may be economically disadvantageous because a side reaction between an etherifying agent and water may occur during the subsequent preparation of cellulose ether. Moreover, cellulose ether having a desired degree of substitution may not b obtained and an aqueous solution of the cellulose ether thus prepared may not be inferior in transparency. When the concentration is more than 60% by weight, the solution may not be handled easily because of an increase in viscosity. The concentration of the alkali metal hydroxide solution to be provided for the contact with the pulp may be preferably kept constant in order to stabilize the composition of the alkali cellulose and ensure the transparency of the cellulose ether.

According to the invention, the uniformity of the alkali distribution can be improved even if an inert solvent such as lower alcohol preferably having 1 to 4 carbons is not used. However, use of such a solvent does not pose any problem. Use of such a solvent can improve uniformity of alkali distribution and bulk density of alkali cellulose.

According to the present invention, after the pulp and the alkali metal hydroxide solution are brought into contact with each other in the rotary feeder type contactor, an excess alkali metal hydroxide solution is removed from the contact mixture by a drainer such as a squeezer so as to obtain alkali cellulose.

The drainer may include a drainer making use of a centrifugal force such as a decanter or a rotating basket; a mechanical drainer such as a roll type, a V-shaped disc press or screw press; and a vacuum filter. From the viewpoint of uniform draining, a drainer making use of a centrifugal force may be preferred. In addition, it may be preferable that a drainer can conduct continuous treatment. Examples may include a screw discharge type centrifugal dehydrator, an extrusion plate type centrifugal separator and a decanter. In a drainer making use of centrifugal force, a required draining degree can be attained by adjusting the rotation speed of the drainer. In a mechanical drainer and a vacuum filter, a required draining degree can be attained by adjusting a draining pressure and a degree of vacuum, respectively.

The alkali solution recovered by draining can be recycled. When it is recycled, an alkali metal hydroxide solution may be preferably supplied to the system continuously in an amount equal to that of the alkali metal hydroxide solution taken out of the system as alkali cellulose. In this case, it may be possible to transfer the alkali solution recovered by draining to the tank once, and then feed it from the tank to an apparatus for contact, and then add a new alkali metal hydroxide solution so as to keep a constant level in the tank.

When the alkali solution recovered by draining is recycled, it may be especially preferable that both of a continuous centrifugal separator having a perforated rotor and a continuous centrifugal separator having an imperforate rotor are used together. This makes it possible to prevent the clogging of the centrifugal separator having a perforated rotor and prevent filtration failure or oscillation of the centrifugal separator caused thereby. First of all, a mixture obtained by the contact of the pulp with the alkali metal hydroxide solution is separated into a liquid and a solid by using a continuous centrifugal separator equipped with a perforated rotor. Then, the fine solid in the separated liquid is further separated by a continuous centrifugal separator having an imperforate rotor. A part or all of the liquid separated by the continuous centrifugal separator having a perforated rotor can be directly introduced into the continuous centrifugal separator having an imperforate rotor. Alternatively, it can be placed in the tank and then introduced into the continuous centrifugal separator having an imperforate rotor. The solid recovered from the separated liquid by the continuous centrifugal separator having an imperforate rotor can be used as alkali cellulose.

The continuous centrifugal separator can control the number of rotation, depending on the contact time and the contact temperature between pulp and an alkali metal hydroxide solution, and necessary draining degree. In other words, the continuous centrifugal separator can control a centrifugal effect. The control of the centrifugal effect can keep the concentration of the alkali metal hydroxide solution constant, the solution being fed repeatedly for the contact with the pulp. Consequently, the cellulose ether having high transparency can be obtained. When the contact time and/or the contact temperature is increased from the present operation, the centrifugal effect can be reduced. When the contact time and/or contact temperature is lowered, the centrifugal effect can be increased. It may be preferable to keep the variation of the concentrations of the alkali metal hydroxide solution within ±10%, especially preferably ±5%.

Incidentally, the centrifugal effect is a value indicating a magnitude of the centrifugal force and is given by a ratio of the centrifugal force to the gravity (see "New Edition Chemical Engineering Dictionary Edited by Society for Chemical Engineers, Japan", published on May 30, 1974). The centrifugal effect Z is represented by the following equation.

$$Z=(\omega^2 r)/g=V^2/(gr)=\pi^2 N^2 r/(900g)$$

wherein "r" represents a rotational diameter (unit: m) of a rotator, "ω" represents an angular rate (unit: rad/sec) of a rotator, "V" represents a circumferential rate (unit: m/sec) of a rotator, "N" represents a rotational number (unit: rpm) of a rotator and "g" represents a gravitational acceleration (unit: m/sec$^2$).

A weight ratio of the alkali metal hydroxide contained by the cake obtained by draining to the solid portion contained by the pulp (alkali metal hydroxide/solid portion in the pulp) may be preferably 0.3 to 1.5, more preferably 0.65 to 1.30, still more preferably 0.90 to 1.30. When the weight ratio falls within a range of 0.3 to 1.5, the cellulose ether thus obtained has improved transparency. The solid portion in the pulp may include, in addition to cellulose which is a main component, hemicellulose, lignin, organic matters such as a resin, and inorganic matters such as Se and Fe components.

The weight ratio of (alkali metal hydroxide)/(solid portion in the pulp) can be determined by the following titration method.

First, 4.00 g of a cake is sampled and the weight percentage (wt %) of the alkali metal hydroxide contained in the cake is determined by neutralization titration (0.5 mol/L H$_2$SO$_4$, indicator: phenolphthalein). A blank test is also performed in a similar manner.

Wt % of alkali metal hydroxide=(normality factor)×{(dropped amount (ml) of H$_2$SO$_4$)−(dropped amount (ml) of H$_2$SO$_4$ in blank test)}

Using the wt % of the alkali metal hydroxide contained by the cake, a weight ratio of the alkali metal hydroxide to the solid portion in the pulp is then determined in accordance with the following equation:

(weight of alkali metal hydroxide)/(weight of solid portion in pulp)=(wt % of alkali metal hydroxide)÷[{100−(wt % of alkali metal hydroxide)/(B/100)}×(S/100)].

In the above equation, "B" represents the concentration (wt %) of the alkali metal hydroxide solution and "S" represents the concentration (wt %) of the solid portion in the pulp. The concentration of the solid portion in the pulp is obtained by dividing the residual weight after drying about 2 g of sampled pulp at 105° C. for 2 hours, by the weight of the sampled pulp and is expressed by weight percentage.

A feed rate of the pulp to the rotary feeder type conveyor; and a recovery rate of the alkali cellulose after draining, or a consumption rate of the alkali metal hydroxide solution are measured. The composition of the alkali cellulose at present is calculated based on their weight ratios. The contact time, a temperature of the alkali metal hydroxide solution in the rotary feeder type conveyor, or draining degree such as a squeezing pressure can be controlled so as to conform the calculated composition to a target composition. The above-described measurements, calculation and controlling operations can be automated.

The composition of the alkali cellulose can be determined by the etherification degree of cellulose ether obtained from the alkali cellulose, that is, the molar substitution degree or value.

Using the alkali cellulose obtained by the above-described preparation method as a raw material, cellulose ether can be prepared in a known manner.

The reaction method may include a batch type or a continuous type. The continuous type is employed for the preparation of the alkali cellulose according to the present invention so that continuous type for the preparation of cellulose ether is preferred, but batch reaction is feasible.

In the batch type, the alkali cellulose discharged from the drainer may be stored in a buffer tank or charged directly in an etherification reactor. It may be preferable to store the alkali cellulose in the buffer tank and then charge the alkali cellulose in a reaction vessel in a short period of time in order to reduce its occupancy time in the etherification reactor. This leads to an increase in productivity. The buffer tank is preferably evacuated or purged with nitrogen so as to form an oxygen-free atmosphere therein, whereby a reduction in the polymerization degree can be suppressed.

Examples of cellulose ether obtainable from the resulting alkali cellulose as a starting material may include alkyl cellulose, hydroxyalkyl cellulose, hydroxyalkylalkyl cellulose and carboxymethyl cellulose.

Examples of the alkyl cellulose may include methyl cellulose having a methoxyl group of 1.0 to 2.2 (D.S.) and ethyl cellulose having ethoxyl group of 2.0 to 2.6 (D.S.). It should be noted that D.S. (degree of substitution) means the average number of substituted hydroxyl groups in the anhydrous glucose unit, while M.S. (molar substitution) means the average number of substituents in the anhydrous glucose unit.

Examples of the hydroxyalkyl cellulose may include hydroxyethyl cellulose having a hydroxyethoxyl group of 0.05 to 3.0 (M.S.) and hydroxypropyl cellulose having a hydroxypropoxyl group of 0.05 to 3.3 (M.S.).

Examples of the hydroxyalkylalkyl cellulose may include hydroxyethylmethyl cellulose having a methoxyl group of 1.0 to 2.2 (D.S.) and a hydroxyethoxyl group of 0.1 to 0.6 (M.S.), hydroxypropylmethyl cellulose having a methoxyl group of 1.0 to 2.2 (D.S.) and a hydroxypropoxyl group of 0.1 to 0.6 (M.S.), and hydroxyethylethyl cellulose having an ethoxyl group of 1.0 to 2.2 (D.S.) and a hydroxyethoxyl group of 0.1 to 0.6 (M.S.).

Carboxymethyl cellulose having a carboxymethoxyl group of 0.2 to 2.2 (D.S.) can also be given as an example of cellulose ether.

Examples of the etherifying agent may include alkyl halide such as methyl chloride and ethyl chloride; alkylene oxide such as ethylene oxide and propylene oxide; and monochloroacetic acid.

EXAMPLES

The present invention will hereinafter be described by Examples. It should not be construed that the present invention is not limited to or by these Examples.

Example 1

A rotary feeder type apparatus (rotating filter) having a drum inner diameter of 240 mm, a chamber height of 15 mm, a chamber width of 100 mm and a screen size of 0.08 mm was installed. The rotational speed of the drum was set at 75 rph. From a connection pipe (a), 4-mm square pulp chips having a solid concentration of 93 wt % was introduced at a rate of 15 kg/hr. From each of nozzles (b), (c) and (d), a 49 wt % aqueous sodium hydroxide solution of 40° C. was fed at a rate of 150 L/hr.

The outlet of the rotary feeder type contactor was connected to a V-shaped disc press. A contact mixture of the pulp chips and the sodium hydroxide solution discharged from the rotary feeder type contactor was drained continuously. The weight ratio of the alkali metal hydroxide contained by the alkali cellulose thus obtained to the solid portion contained by the pulp, which was determined by the titration method, was 1.25.

Example 2

In a similar manner to Example 1 except that the rotational speed of the drum was set at 110 rph and the outlet of the rotary feeder type contactor was connected to a screw discharge type centrifugal dehydrator having a centrifugal effect of 600 as a drainer, alkali cellulose was prepared. The weight ratio of the alkali metal hydroxide contained by the alkali cellulose thus obtained to the solid portion contained by the pulp, which was determined by the titration method, was 1.00.

Example 3

The alkali cellulose (20 kg) obtained in Example 1 was placed in a pressure-resistant reactor. After vacuuming, 11 kg of methyl chloride and 2.7 kg of propylene oxide were added for a reaction. The reaction product was washed, dried and pulverized to yield hydroxypropylmethyl cellulose. The resulting hydroxypropylmethyl cellulose had a methoxyl group (DS) of 1.90 and hydroxypropoxyl (MS) of 0.24. A 2 wt % aqueous solution of the hydroxypropylmethyl cellulose had a viscosity of 10,000 mPa·s at 20° C. The light transmittance at 20° C. of a 2 wt % aqueous solution of the hydroxypropylmethyl cellulose was measured using a photoelectric calorimeter "PC-50", a cell length of 20 mm and visible light and was 98.0%.

Example 4

The rotary feeder type contactor same as one employed in Example 1 was installed. The rotational speed of the drum was set at 110 rph. From a connection pipe (a), 4-mm square pulp chips having a solid concentration of 93 wt % was introduced at a rate of 15 kg/hr. From each of nozzles (b), (c) and (d), a 44 wt % aqueous sodium hydroxide solution of 40° C. was fed at a rate of 150 L/r. The outlet of the rotary feeder type contactor was connected to a screw discharge type centrifugal dehydrator as a drainer. A contact mixture of the pulp chips and the sodium hydroxide solution discharged from the rotary feeder type contactor was drained continuously at a centrifugal effect of 600. The liquid thus separated was received by the tank and recycled for the contact with the pulp. A 49 wt % aqueous sodium hydroxide solution was fed to the tank continuously in order to keep the solution level in the tank constant. The concentration of the solution in the tank was maintained at 44 wt %. The weight ratio of the alkali metal hydroxide contained by the alkali cellulose thus obtained to the solid portion contained by the pulp, which was determined by the titration method, was 1.00.

In a pressure-resistant reactor was placed 5.5 kg in terms of cellulose content of the alkali cellulose thus obtained. After vacuuming, 9 kg of methyl chloride and 1.4 kg of propylene oxide were added for a reaction. The reaction product was then washed, dried and pulverized to yield hydroxypropylmethyl cellulose. The degree of substitution of the resulting cellulose ether, the viscosity at 20° C. of a 2 wt % aqueous solution of the cellulose ether, and the light transmittance at 20° C. of the 2 wt % aqueous solution thereof are shown in Table 1. The light transmittance at 20° C. of a 2 wt % aqueous solution thereof was measured using a photoelectric calorimeter "PC-50", cell length of 20 mm and visible light.

Example 5

The rotary feeder type contactor same as one employed in Example 1 was installed. The rotational speed of the drum was set at 110 rph. From a connection pipe (a), 4-mm square pulp chips having a solid concentration of 93 wt % was introduced at a rate of 15 kg/hr. From each of nozzles (b), (c) and (d), a 44 wt % aqueous sodium hydroxide solution of 40° C. was fed at a rate of 150 L/r. The outlet of the rotary feeder type contactor was connected to a screw discharge type centrifugal dehydrator as a drainer. A contact mixture of the pulp chips and the sodium hydroxide solution discharged from the rotary feeder type contactor was drained continuously at a centrifugal effect of 600. The liquid thus separated was received by the tank and then sent, by a pump, to a decanter which was under operation at a centrifugal effect of 2500, where the fine solid was collected. The fine solid thus collected was mixed with the alkali cellulose. The liquid which had passed through the decanter returned to the tank and recycled for the contact with the pulp. A 49 wt % aqueous sodium hydroxide solution was fed to the tank continuously in order to keep the solution level in the tank constant. The concentration of the solution in the tank was kept at 44 wt %. The weight ratio of the alkali metal hydroxide contained by the alkali cellulose thus obtained to the solid portion contained by the pulp, which was determined by the titration method, was 1.00.

In a pressure-resistant reactor was placed 5.5 kg in terms of cellulose content of the alkali cellulose thus obtained. After vacuuming, 9 kg of methyl chloride and 1.4 kg of propylene oxide were added for a reaction. The reaction product was then washed, dried and pulverized to yield hydroxypropylmethyl cellulose. The degree of substitution of the resulting cellulose ether, and a viscosity at 20° C. of a 2 wt % aqueous solution of the cellulose ether and the light transmittance at 20° C. of a 2 wt % aqueous solution thereof are shown in Table 1. The light transmittance at 20° C. of a 2 wt % aqueous solution thereof was measured using a photoelectric calorimeter "PC-50", a cell length of 20 mm and visible light.

Example 6

In a similar manner to Example 5 except that the temperature of the 44 wt % aqueous sodium hydroxide solution was changed to 20° C. and the centrifugal effect of the screw discharge type centrifugal dehydrator was changed to 1000, alkali cellulose was obtained. The concentration of the aqueous sodium hydroxide solution in the tank was kept at 44 wt %. The weight ratio of the alkali metal hydroxide contained by the alkali cellulose thus obtained to the solid portion contained by the pulp, which was determined by the titration method, was 0.60.

In a similar manner to that employed in Example 5 except that 6.5 kg of methyl chloride and 1.2 kg of propylene oxide were added, cellulose ether was prepared. The viscosity at 20° C. of a 2 wt % aqueous solution of the cellulose ether and the transmittance at 20° C. of a 2 wt % aqueous solution thereof are shown in Table 1.

Example 7

In a similar manner to Example 5 except that the rotation speed of the drum of the rotary feeder type contactor was changed to 75 rph and the centrifugal effect of the screw discharge type centrifugal dehydrator was changed to 300, alkali cellulose was obtained. The concentration of the aqueous sodium hydroxide solution in the tank was kept at 44 wt %. The weight ratio of the alkali metal hydroxide contained by the alkali cellulose thus obtained to the solid portion contained by the pulp, which was determined by the titration method, was 1.25.

In a similar manner to that employed in Example 5 except that 11 kg of methyl chloride and 2.7 kg of propylene oxide were added, cellulose ether was prepared. The viscosity at 20° C. of a 2 wt % aqueous solution of the cellulose ether and the transmittance at 20° C. of a 2 wt % aqueous solution thereof are shown in Table 1.

Example 8

In a similar manner to Example 4 except that the rotational speed of the drum of the rotary feeder type contactor was changed to 75 rph, alkali cellulose was obtained. The centrifugal effect of the screw discharge type centrifugal dehydrator was left at 600. The concentration of the aqueous sodium hydroxide solution in the tank became 46 wt %. The weight ratio of the alkali metal hydroxide contained by the alkali cellulose thus obtained to the solid portion contained by the pulp, which was determined by the titration method, was 1.25.

In a similar manner to that employed in Example 5 except that 11 kg of methyl chloride and 2.7 kg of propylene oxide were added, cellulose ether was prepared. The viscosity at 20° C. of a 2 wt % aqueous solution of the cellulose ether and the transmittance at 20° C. of a 2 wt % aqueous solution thereof are shown in Table 1.

TABLE 1

| | Substitution degree of cellulose ether | | Aqueous 2 wt % solution of cellulose ether | |
|---|---|---|---|---|
| | Methoxyl group (DS) | Hydroxypropoxyl group (MS) | Viscosity (mPa · s) | Transmittance at 20° C. (%) |
| Example 4 | 1.80 | 0.15 | 9980 | 96.5 |
| Example 5 | 1.80 | 0.15 | 10040 | 96.5 |
| Example 6 | 1.40 | 0.20 | 10040 | 93.0 |
| Example 7 | 1.90 | 0.25 | 10030 | 98.5 |
| Example 8 | 1.90 | 0.25 | 10000 | 97.0 |

The invention claimed is:

1. A method for preparing cellulose ether, comprising the steps of:
    introducing pulp into continuous contact with a 23 to 49% by weight alkali metal hydroxide solution at a starting contact time in a rotary feeder type contactor to generate a contact mixture;
    draining the contact mixture to separate a solid alkali cellulose cake from an excess liquid alkali metal hydroxide solution in which completion of the draining step defines a final contact time between the pulp and alkali metal hydroxide solution; said starting contact time and said final contact time define a total contact time for the pulp and alkali metal hydroxide solution, said total contact time for the pulp and alkali metal hydroxide solution is from 1 second to 15 minutes; and
    subsequent to the draining step, etherifying the solid alkali cellulose cake obtained in the draining step with an etherifying agent to produce cellulose ether.

2. The method for preparing cellulose ether according to claim 1, wherein a weight ratio of alkali metal hydroxide contained by the cake obtained in the draining step to a solid portion contained by the pulp is 0.3 to 1.5.

3. The method for preparing cellulose ether according to claim 2, wherein the weight ratio of alkali metal hydroxide contained by the cake obtained in the draining step to a solid portion contained by the pulp is controlled by changing a rotational speed of a rotary feeder of the rotary feeder type contactor.

4. The method for preparing cellulose ether according to claim 1, wherein a weight ratio of alkali metal hydroxide contained by a cake obtained in the draining step to a solid portion contained by the pulp is controlled by changing a rotational speed of a rotary feeder of the rotary feeder type contactor.

5. The method for preparing cellulose ether according to claim 1, wherein a temperature of the alkali metal hydroxide solution is from 20 to 80° C.

6. The method for preparing cellulose ether according to claim 1, wherein the total contact time between the pulp and the alkali metal hydroxide solution is from 2 seconds to 2 minutes.

7. The method for preparing cellulose ether according to claim 1, wherein the total contact time between the pulp and the alkali metal hydroxide solution is controlled at least in part by adjusting a rotational speed of the rotary feeder type contactor.

8. The method for preparing cellulose ether according to claim 1, wherein the draining step comprises feeding the contact mixture into a drainer making use of a centrifugal force to separate solids from liquid; wherein the total contact time between the pulp and the alkali metal hydroxide solution is controlled at least in part by adjusting the centrifugal force.

9. The method for preparing cellulose ether according to claim 8, wherein drainer comprises a centrifugal separator and the total contact time between the pulp and the alkali metal hydroxide solution is controlled at least in part by adjusting a rotation speed of the centrifugal separator.

10. The method for preparing cellulose ether according to claim 1, wherein the rotary feeder type contactor comprises: (i) a fixed housing; said fixed housing being divided into a plurality of separate working chambers defined by at least one partition element; and (ii) a cyclic contact drum, said cyclic contact drum configured to rotate relative to said housing; said cyclic contact drum being divided into a plurality of filter cells;
    wherein said pulp is introduced into a first working chamber of said plurality of working chambers and said alkali metal hydroxide solution is introduced into one or more of said plurality of working chambers to generate said contact mixture; said contact mixture being carried through at least one additional working chamber.

11. The method for preparing cellulose ether according to claim 10, wherein the pulp is introduced into said first working chamber and is carried through at least one additional working station chamber while being in contact with said alkali metal hydroxide solution prior to exiting the rotary feeder type contactor through a second, separate, working chamber.

12. The method for preparing cellulose ether according to claim 10, wherein said filter cells being arranged in a circumferential directions inside of the fixed housing.

13. The method for preparing cellulose ether according to claim 10, wherein the rotary feeder type contactor is operated at a rotational speed from 1 to 3,000 rph.

* * * * *

UNITED STATES PATENT AND TRADEMARK OFFICE
CERTIFICATE OF CORRECTION

| | | |
|---|---|---|
| PATENT NO. | : 8,865,889 B2 | Page 1 of 1 |
| APPLICATION NO. | : 11/614717 | |
| DATED | : October 21, 2014 | |
| INVENTOR(S) | : Narita et al. | |

It is certified that error appears in the above-identified patent and that said Letters Patent is hereby corrected as shown below:

In the claims:

Column 12,
Line 52, Claim 11, "working station chamber" should read --working chamber--.

Signed and Sealed this
Ninth Day of June, 2015

Michelle K. Lee
*Director of the United States Patent and Trademark Office*